United States Patent [19]

Kolycheck et al.

[11] 4,289,825

[45] Sep. 15, 1981

[54] ELASTOMERIC POLYURETHANES COATED WITH A VINYL CHLORIDE POLYMER POWDER

[75] Inventors: Edmond G. Kolycheck, Lorain; Richard M. Herman, Elyria, both of Ohio

[73] Assignee: The B. F. Goodrich Company, Akron, Ohio

[21] Appl. No.: 180,193

[22] Filed: Aug. 22, 1980

Related U.S. Application Data

[63] Continuation of Ser. No. 55,943, Jul. 9, 1979, abandoned.

[51] Int. Cl.³ .............................................. B32B 27/40
[52] U.S. Cl. ..................................... 428/407; 428/403; 428/423.1; 428/424.2; 428/424.4; 428/424.6; 428/515
[58] Field of Search ............... 428/407, 403, 425, 518, 428/424.2, 424.4, 424.6, 423.1, 357

[56] References Cited

U.S. PATENT DOCUMENTS

| | | | |
|---|---|---|---|
| 4,040,996 | 8/1977 | Van Vonno | 428/407 X |
| 4,091,162 | 5/1978 | Henderson et al. | 428/407 X |
| 4,112,176 | 9/1978 | Bailey | 428/407 X |
| 4,126,454 | 11/1978 | Jones | 428/407 X |

*Primary Examiner*—Thomas J. Herbert, Jr.
*Attorney, Agent, or Firm*—J. Hughes Powell, Jr.

[57] ABSTRACT

Elastomeric polyurethanes in granular form are coated with a vinyl chloride polymer powder.

7 Claims, No Drawings

ELASTOMERIC POLYURETHANES COATED WITH A VINYL CHLORIDE POLYMER POWDER

This is a continuation, of application Ser. No. 055,943, filed July 9, 1979 now abandoned.

BACKGROUND OF THE INVENTION

Elastomeric polyurethanes find many applications because of the excellent balance of physical properties of these elastomers including adhesive properties. In many applications, a finely divided or granular form of the polyurethane is desired. While this can be obtained in a number of ways, since elastomeric polyurethanes are normally prepared by bulk polymerization technique and formed into sheets, strips, and the like, it is necessary to grind or granulate these solid continuous forms of the polyurethane elastomers to provide them in the desired finely divided state. In this state, particularly during shipping, under long storage conditions and particularly under the effect of pressure and heat, the particles tend to adhere together and form solid masses, which require an additional difficult step of regranulation before use. Elastmeric polyurethanes in granular form that resist adhesion during shipping and storage are desired.

SUMMARY OF THE INVENTION

Elastomeric polyurethanes in granular form that have a coating of a vinyl chloride polymer have been found to be satisfactory in packing, shipping and handling, and more importantly, such coating materials do not adversely effect the physical properties of the polymers or result in solutions having undesirable opacity or haze.

DETAILED DESCRIPTION

The elastomeric polyurethanes are readily prepared from a variety of compounds having terminal functional groups reactive with organic polyisocyanates. Normally used are hydroxyl-terminated compounds. The hydroxyl-terminated compounds or macroglycols usually have molecular weights greater than about 300. A great variety of such macroglycols have been prepared and proposed for commercial applications. The most commonly used macroglycols are hydroxyl-terminated polyesters, polyethers, polylactones and polybutadienes. In the preparation of one type of polyurethane from such macroglycols, alone or in admixture, having molecular weights greater than about 1500, and containing difunctional chain extenders such as glycols and diamines, are reacted with the organic polyisocyanate. Useful materials are obtained by reacting an organic diisocyanate with a mixture of a macroglycol and a low molecular weight difunctional chain extender such as an alkylene glycol or ether glycol, a cycloaliphatic glycol, or an aromatic-aliphatic glycol. The so-called prepolymer technique may be used where an excess of organic diisocyanate is first reacted with the macroglycol and then the low molecular weight difunctional chain extender added, normally in amounts equivalent to react with substantially all of the free isocyanate groups.

The hydroxyl polyester macroglycols are linear hydroxyl-terminated polyesters have molecular weights between about 1800 and 6000 and acid numbers usually less than about 10. The polyesters utilized include those prepared by the polyesterification of aliphatic dicarboxylic acids including for example adipic, succinic, pimelic, suberic, azelaic, sebacic and the like or their anhydrides. Aromatic dicarboxylic acids may also be used, or mixtures of aliphatic and aromatic dicarboxylic acids. Useful acids include aliphatic dicarboxylic acids of the formula HOOC—R—COOH where R is an alkylene radical containing 2 to 8 carbon atoms. The phthalic acids are also useful.

The glycols used in the preparation of the polyesters by reaction with the dicarboxylic acids are aliphatic glycols containing between 2 and 10 carbon atoms such as ethylene glycol, propanediol, butanediol-1,4, hexamethylene glycol, octamethylene glycol, 2-ethyl-1,6-hexanediol, neopentyl glycol and the like. Preparation of the specific polyesterurethanes from polyesters are described in U.S. Pat. No. 2,871,218 for example. Polyesteramides also are contemplated, usually by substitution of a diamine or amine alcohol for at least part of the glycol.

Poly(epsilon-caprolactone)diol macroglycols are the polyester reaction products of epsilon-caprolactones whose polymerization has been initiated by bifunctional compounds having two active hydrogen sites which are capable of opening the lactone ring and initiating polymerization of the lactone. These bifunctional materials may be represented by the formula HX—R—XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains 2 to 10 carbon atoms for example, ethylene glycol, 1,2-propane diol, 1,4-butanediol, hexamethylene glycol and the like. Ethylene glycol provides excellent polyesters.

The lactones preferred for preparing the polyesters are epsilon-caprolactones having the general formula

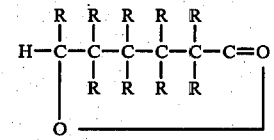

wherein at least 6 of the R's are hydrogen and the remainder are hydrogen or alkyl groups containing 1 to 10 carbon atoms, preferably methyl. Mixtures of lactones may be employed to form the polyesters as epsilon-caprolactone and trimethyl-epsilon-caprolactone, methyl-epsilon-caprolactone, β-methyl-epsilon-caprolactone, dimethyl-epsilon-caprolactone and the like. The lactones are polymerized readily be heating with the bifunctional reactant to a temperature of about 100° to about 200° C. Catalysts may be employed if desired. Particularly preferred are poly(epsilon-caprolactone) diols having molecular weight in the range of about 1500 to about 5000.

The hydroxyl(polyalkylene oxide), or polyether, macroglycols preferably are essentially linear hydroxyl-terminated compounds having ether linkages as the major hetero-atom linkage joining carbon atoms. The molecular weights may vary between about 500 to 4000. The hydroxyl(polyalkylene oxide)s found useful include hydroxyl poly(methylene oxide)s such as hydroxyl poly(tetramethylene oxide), hydroxyl poly(trimethylene oxide), hydroxyl poly(hexamethylene oxide), hydroxyl poly(ethylene oxide) and the like of the formula HO[(CH$_2$)$_n$O]$_x$H wherein n is a number from 2 to 6 and x is an integer, and alkyl substituted types such as hydroxyl poly(1,2-propylene oxide). Preparation of polyurethanes from such polyethers is described in U.S. Pat. No. 2,899,411 for example.

If low molecular weight glycols are used as chain extender with the macroglycols and the organic diisocyanate, these normally are aliphatic glycols or ether glycols containing 2 to 10 carbon atoms. Typical glycols which have been employed include ethylene glycol, propylene glycol, 1,4-butane-diol, hexanediol, 2-ethyl-1,6-hexanediol, neopentyl glycol and the like. Cycloaliphatic glycols such as cyclohexanedimethanol, and aromatic-aliphatic glycols such as bis-1,4($\beta$-hydroxyethoxy) benzene may also be employed.

The amount of glycol chain extender used with the macroglycol and the diisocyanate may vary from about 0.1 to 12 mols per mol of macroglycol. Excellent polyurethanes are obtained with a molar ratio of one mol of macroglycol and 1 to 5 mols of the small chain extender glycol. Substituted glycols also may be used.

The organic diisocyanates which are reacted with the macroglycols will include, for example, both aliphatic and aromatic diisocyanates. Such aliphatic diisocyanates include for example, hexamethylene diisocyanate, methylene-bis(4-cyclohexyl isocyanate), isophorone diisocyanate, etc. The aromatic diisocyanates include naphthalene-1,5-diisocyanate, diphenyl methane-4,4'-diisocyanate, tolylene diisocyanate, p-phenylene diisocyanate, dichlorodiphenyl methane diisocyanate, dimethyl diphenyl methane diisocyanate, bi-benzyl diisocyanate, diphenyl ether diisocyanates, bi-tolylene diisocyanates, cyclohexane diisocyanate and the like. Typical useful diisocyanates have the formula

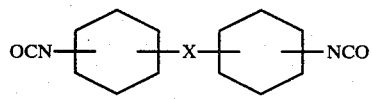

wherein X may be a valence bond, an alkylene radical containing 1 to 5 carbon atoms, NR(where R is an alkyl radical), oxygen, sulfur, sulfoxide, sulfone and the like.

About equimolar ratios of diisocyanate and diols may be used. When a small glycol chain extender is also used, the ratio of reactants employed may be varied from about 1.1 to 13 mols of organic diisocyanate per mol of macroglycol with 0.1 to 12 mols of the glycol. The amount of organic diisocyanate used is dependent on the total amount of glycol chain extender and macroglycol and normally is a molar amount essentially equivalent to the total of these latter two reactants so that there are essentially no free unreacted isocyanate groups remaining in the polymer. Excellent polyurethanes have been obtained when a molar ratio of one mol of macroglycol of molecular weight about 1800 2500, 1 to 3 mols of glycol, and 2 to 4 mols of the aromatic diisocyanate are caused to react. While essentially equimolar amounts of isocyanate and active hydrogen groups are preferred, it will be understood that an excess of any reactant, preferably less than 10%, as 5% of excess organic diisocyanate can be used, although larger amounts of diisocyanate can, of course, be used in forming prepolymers. These, of course, have to be kept free of moisture until further reaction with the chain extender component is desired.

Other polyurethane materials that are well known and prepared in a variety of ways as is described in the patent literature may be used. For example, hydroxyl-terminated polyesters, polyesteramides, polyalkylene ether glycols and the like of molecular weight from about 800 to 3000 or higher are reacted with organic isocyanates, generally with an excess of the diisocyanate. The resulting polyurethane elastomers may be cured or vulcanized by adding additional organic diisocyanate whereas only a slight excess of isocyanate is used to make the polyurethane; or if a substantial excess of organic diisocyanate is used in making the polyurethane, then the isocyanate-terminated polyurethane is mixed or treated or exposed to such amounts of polyfunctional additives such as water, diamines, glycols and the like that will result in its curing or vulcanization. The excess diisocyanate present or added is in amounts from about 1 to 25%, preferably 3 to 15 weight parts per 100 weight parts of polyurethane. Regardless of the source of the polyurethane, the advantages of this invention are realized.

These polyurethanes normally have weight average molecular weights in the range of about 55,000 to about 300,000 or higher. Such polyurethanes normally are soluble in polar solvents for example, methyl ethyl ketone (MEK), tetrahydrofuran (THF), N,N-dimethyl formamide (DMF), cyclohexanone and dimethyl acetamide.

The vinyl halide polymers used in this invention include homopolymers, copolymers and blends of homopolymers and/or copolymers. Useful vinyl halides include vinyl chloride and vinylidene chloride polymers that contain up to about 50% by weight of at least one other olefinically unsaturated monomer, more preferably at least one other vinylidene monomer (i.e., a monomer containing at least one terminal $CH_2<$ group per molecule) copolymerized therewith, even more preferably up to about 20% by weight of such monomers. Suitable monomers include $\alpha$-olefins containing from 2 to 12 carbon atoms, more preferably from 2 to 8 carbon atoms, such as ethylene, propylene, 1-butene, isobutylene, 1-hexene, 4-methyl-1-pentene and the like; dienes containing from 4 to 10 carbon atoms including conjugated dienes as butadiene, isoprene, piperylene and the like; ethylidene norbornene and dicyclopentadiene; vinyl esters and allyl esters such as vinyl acetate, vinyl chloroacetate, vinyl propionate, vinyl butyrate, vinyl laurate, vinyl benzoate, allyl acetate and the like; vinyl aromatics such as styrene, $\alpha$-methyl styrene, chlorostyrene, vinyl toluene, vinyl naphthalene and the like; vinyl and allyl ethers and ketones such as vinyl methyl ether, allyl methyl ether, vinyl isobutyl ether, vinyl, n-butyl ether, vinyl chloroethyl ether, methyl vinyl ketone and the like; vinyl nitriles such as acrylonitrile, methacrylonitrile and the like; cyanoalkyl acrylates such as $\alpha$-cyanomethyl acrylate, the $\alpha$-, $\beta$- and $\gamma$-cyanopropyl acrylates and the like; olefinically unsaturated carboxylic acids and esters thereof, including $\alpha$, $\beta$-olefinically unsaturated acids and esters thereof such as acrylic acid, methacrylic acid, ethacrylic acid, methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methylmethacrylate, ethyl methacrylate, butyl methacrylate, glycidyl methacrylate and the like, wherein the alkyl groups contain 1 to 12 carbon atoms, and including esters of maleic and fumaric acid and the like; amides of the $\alpha$, $\beta$-olefinically unsaturated carboxylic acids such as acrylamide, methacrylamide, and the like; divinyls, diacrylates and other polyfunctional monomers such as divinyl benzene, divinyl ether, diethylene glycol diacrylate, ethylene glycol dimethacrylate, methylene-bis-acrylamide, allyl pentaerythritol, and the like; and bis($\beta$-haloalkyl) alkenyl phosphonates such as bis($\beta$-chloroethyl) vinyl phosphonate and the like.

A group of particularly useful comonomers include 1-olefins containing from 2 to 8 carbon atoms; vinyl esters and allyl esters; olefinically unsaturated carboxylic acids and esters thereof, especially $\alpha,\beta$-olefinically unsaturated acids and esters thereof; esters of maleic and fumaric acid and the like; amides of $\alpha, \beta$-olefinically unsaturated carboxylic acids; and vinylidene or vinyl chloride.

Also included are chlorinated vinyl chloride and blends of vinyl and vinylidene chloride polymers and copolymers with other polymers, both plastics and elastomers.

These vinyl chloride polymers normally are high molecular weight polymers having a specific viscosity greater than 0.4 measured as a 0.4% solution in nitrobenzene.

The vinyl chloride and vinylidene chloride polymers may be prepared by any method known to the art such as by emulsion, suspension, bulk or solution polymerization.

Particularly useful are homopolymers of vinyl chloride and copolymers, more preferably with more than 50 weight percent vinyl chloride and less than 50 weight percent vinylidene chloride, vinyl esters, particularly vinyl acetate, and acrylic and methacrylic acid esters. These polymers normally have inherent viscosity in a range greater than 0.4, more preferably greater than 0.6, up to about 1.6 as measured by ASTM D 1243-66 Technical Buletin, No. 1. The vinyl chloride polymers are in a powder form as from about 0.1 to 35 microns in diameter, more preferably about 0.2 to 5 microns in diameter.

The polyurethane sheet or strip that is to be chopped or granulated may be passed through a bed of the powdered vinyl chloride polymer in a trough, so as to deposit less than 2 weight percent of vinyl chloride powder on the outer surfaces of the polyurethane film or strip. Thereafter the polyurethane is chopped or granulated and packaged for handling and shipment. When such materials are prepared with the vinyl chloride polymer powder coating, which materials preferably contain less than 1 weight percent vinyl chloride polymer powder based on the weight of polyurethane, they retain their granular or chopped form form during handling, and in a 20% solution of the coated polyurethane dissolved in methyl ethyl ketone there is obtained a substantially clear solution.

The chopped or granulated form of the polyurethane is normally in the range of about 1/16 to ⅜ inch. While talc is an effective dusting agent for preventing the the agglomeration of polyurethane granules, the resulting granular material results in cloudy solutions when dissolved in the methyl ethyl ketone, and in many applications, cloudy or hazy solutions are objected to. One such application is the preparation of shoe adhesives. Other polymers tested in an attempt to solve this problem include a copolymer of methyl methacrylate, butadiene and styrene which resulted in a cloudy solution, as did Aerosil, a silicon dioxide powder.

In specific embodiments of the invention, the polyurethane was prepared by reacting 1 mol of polytetramethylene adipate 2000 molecular weight mixed with 0.3 mol of 1,4-butanediol with 1.3 mols of diphenyl methane diisocyanate at temperatures in the range of about 120° C., extruding the resulting polyurethane into a strip which was fed through a trough containing certain powdered vinyl chloride polymers. These polymers included (1) a copolymer of 95% vinyl chloride with 5% vinyl acetate, (2) polyvinyl chloride with the viscosity of 0.7, (3) polyvinyl chloride with a viscosity of 0.74, (4) polyvinyl chloride with a viscosity of 0.9, (5) a copolymer of 97.5% vinyl chloride with 2.5% acrylic acid. In each case, substantially clear solutions of 20% total solid polyurethane and methyl ethyl ketone were obtained, and such materials are readily stored and shipped without substantial compacting. Each of these polymers had about 1 weight percent of the vinyl chloride polymer as the protective agent.

We claim:

1. A composition comprising elastomeric polyurethanes in granular form coated with less than 2 weight percent of a vinyl chloride polymer powder.

2. A composition of claim 1 wherein the polyurethane is 1/16 to ⅜ inch in size and the vinyl chloride polymer is in powder form of from about 0.1 to 35 microns in diameter.

3. A composition of claim 2 wherein said polyurethane is a polyetherurethane, a polyesterurethane, or a polyesteramideurethane.

4. A composition of claim 3 wherein the vinyl chloride polymer is present in amount less than 1 weight percent and contains greater than 50 weight percent copolymerized vinyl chloride.

5. A composition of claim 4 wherein said composition contains a polyurethane coated with less than 1% of a copolymer of vinyl chloride and a vinyl ester.

6. A composition of claim 5 wherein said polyurethane is a polyesterurethane and said vinyl chloride copolymer is a copolymer of a major proportion of vinyl chloride with a minor proportion of vinyl acetate.

7. A composition of claim 6 wherein said polyurethane is a reaction product of polytetramethylene adipate, butanediol-1,4 and an aromatic diisocyanate.

* * * * *